UNITED STATES PATENT OFFICE.

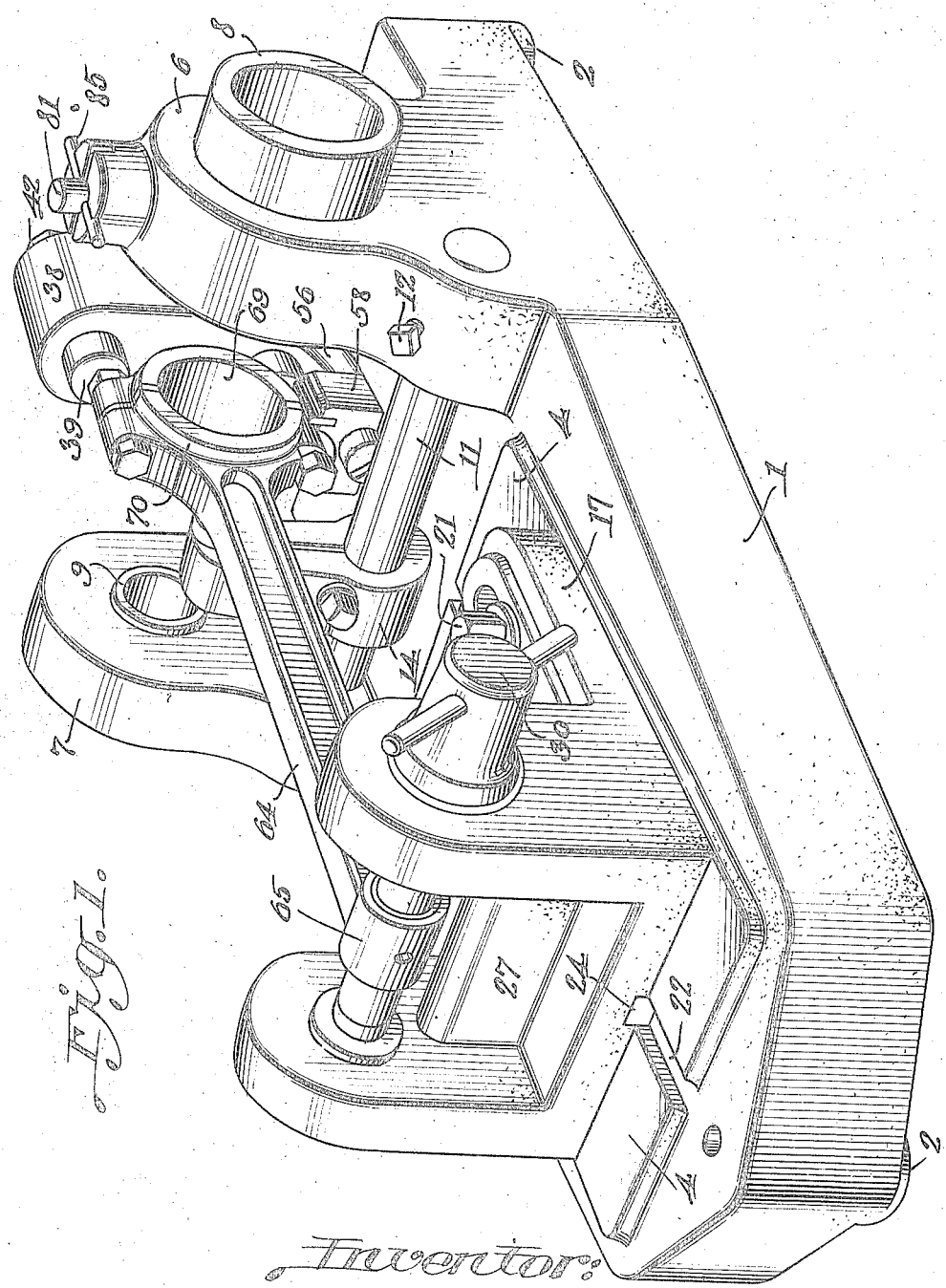

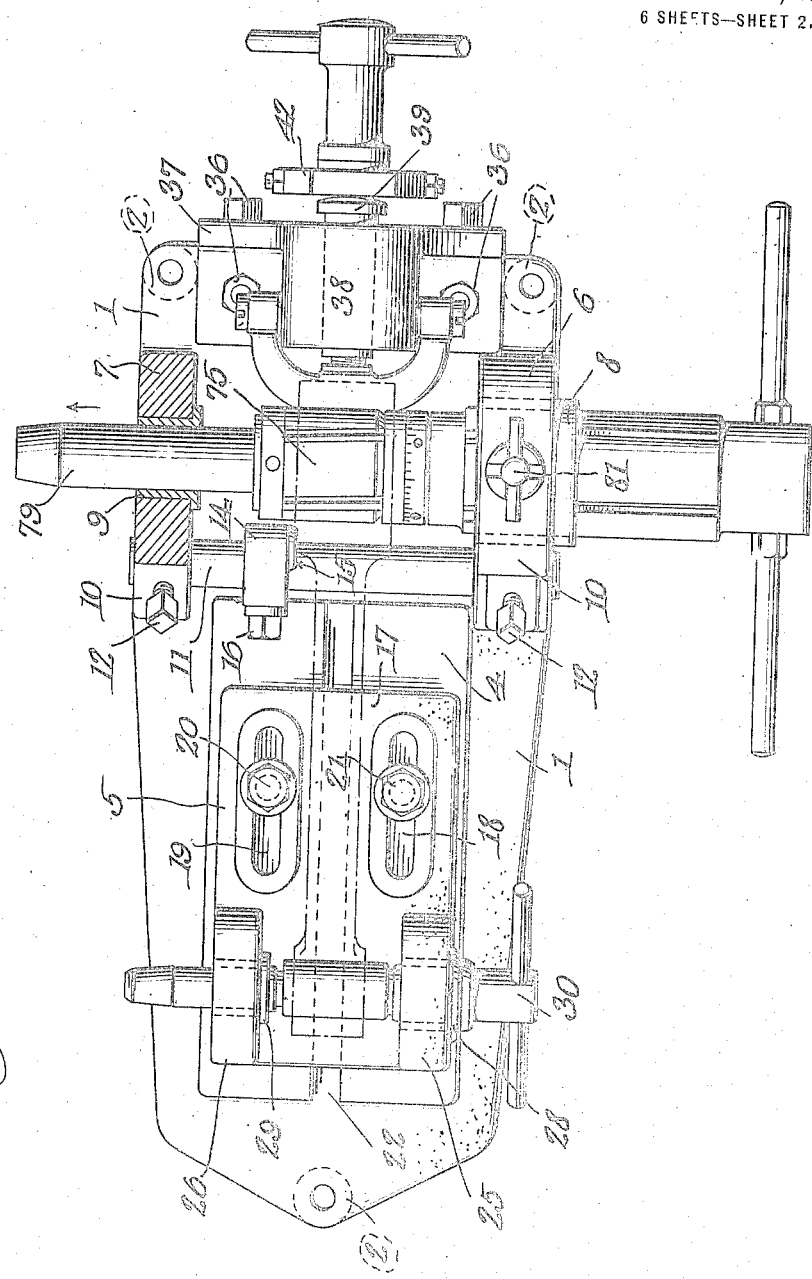

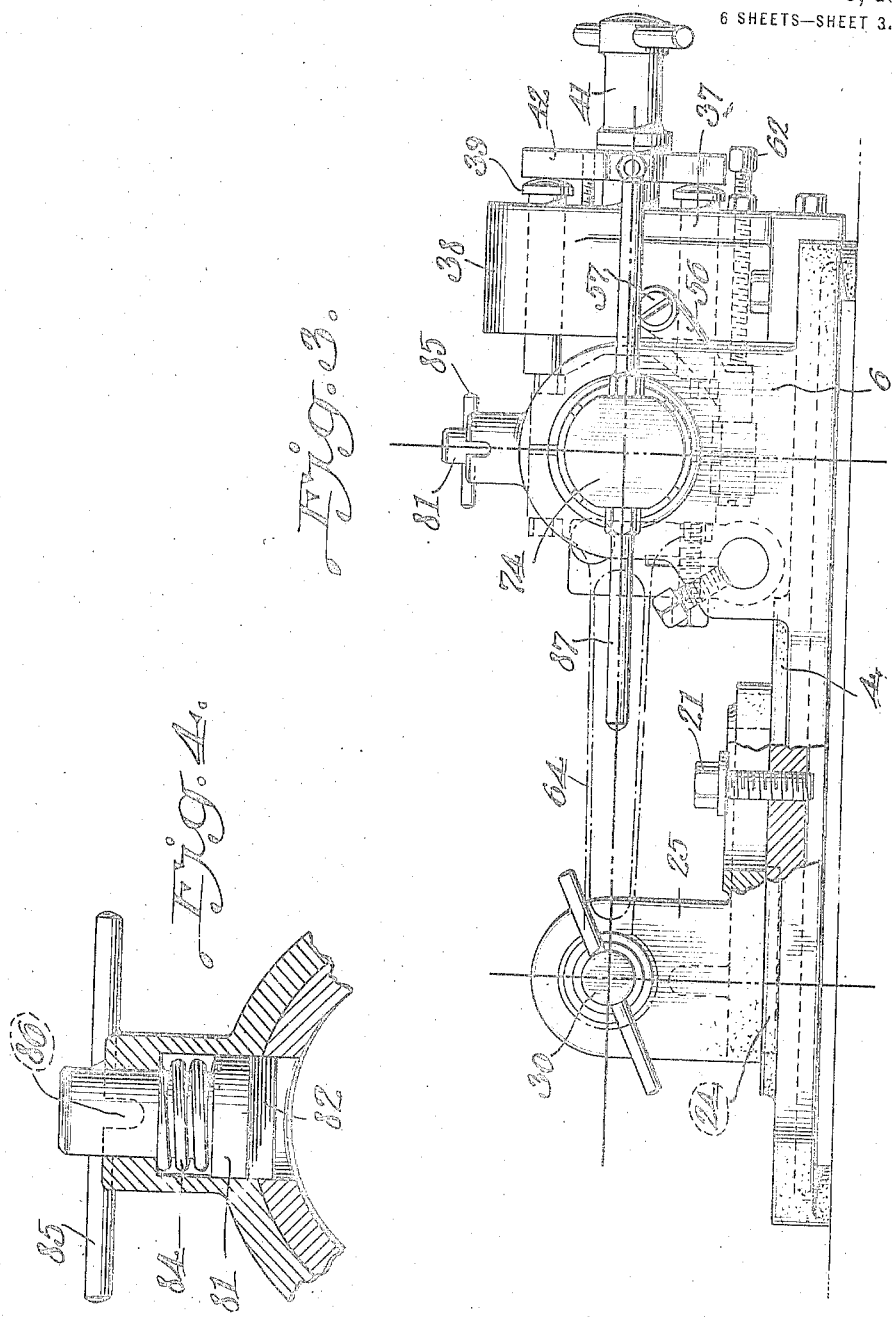

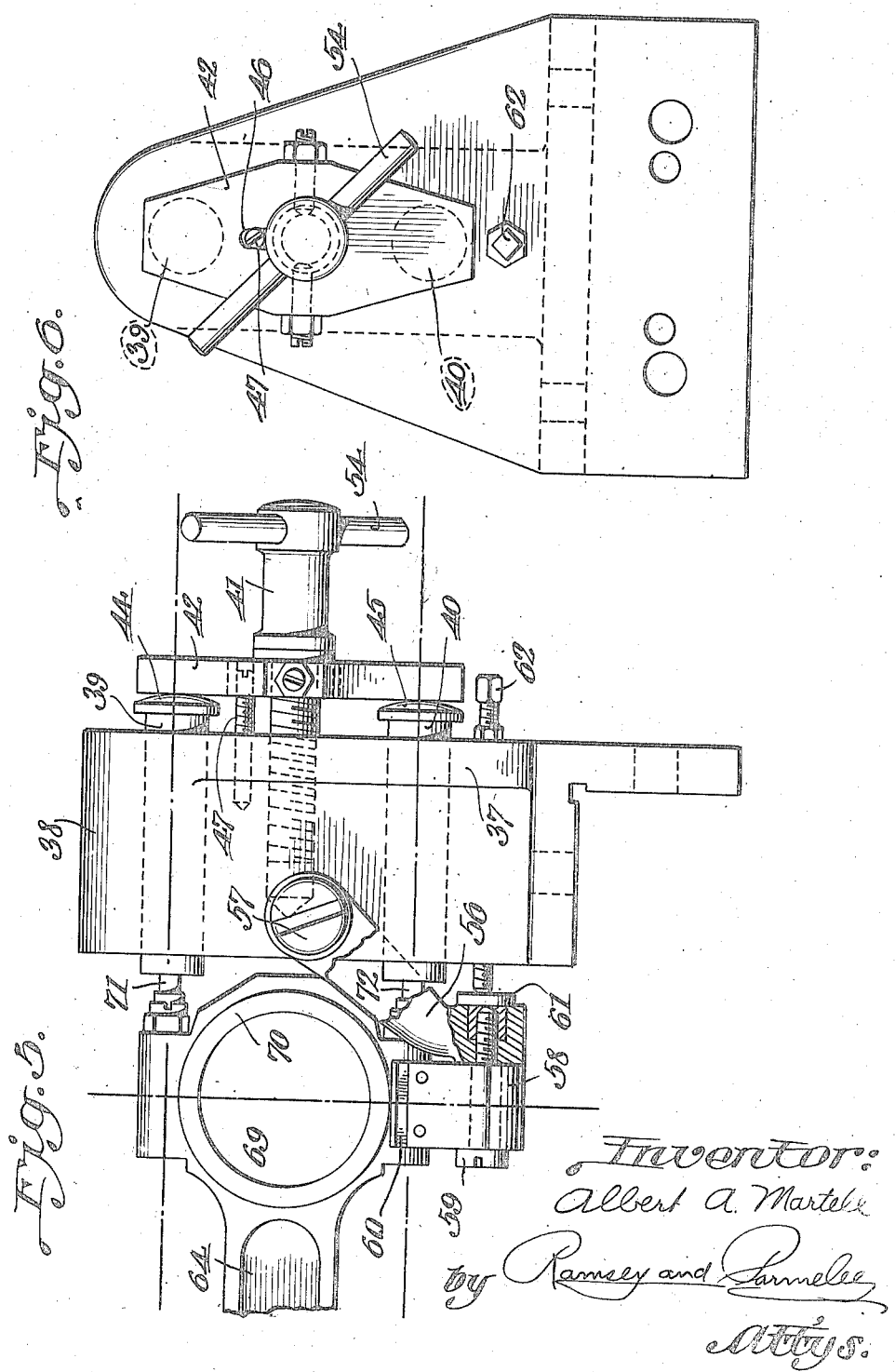

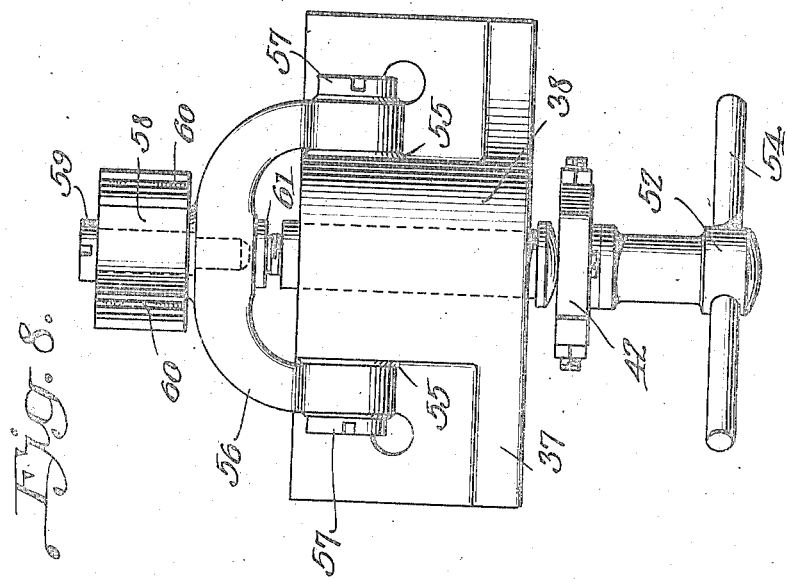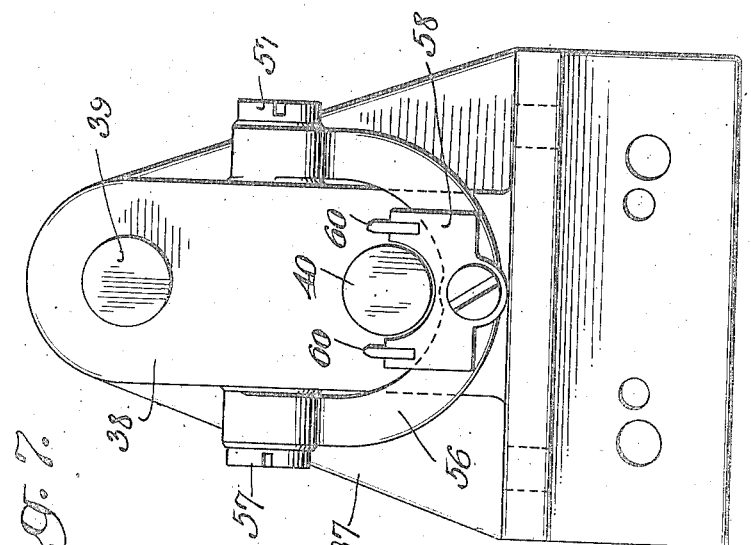

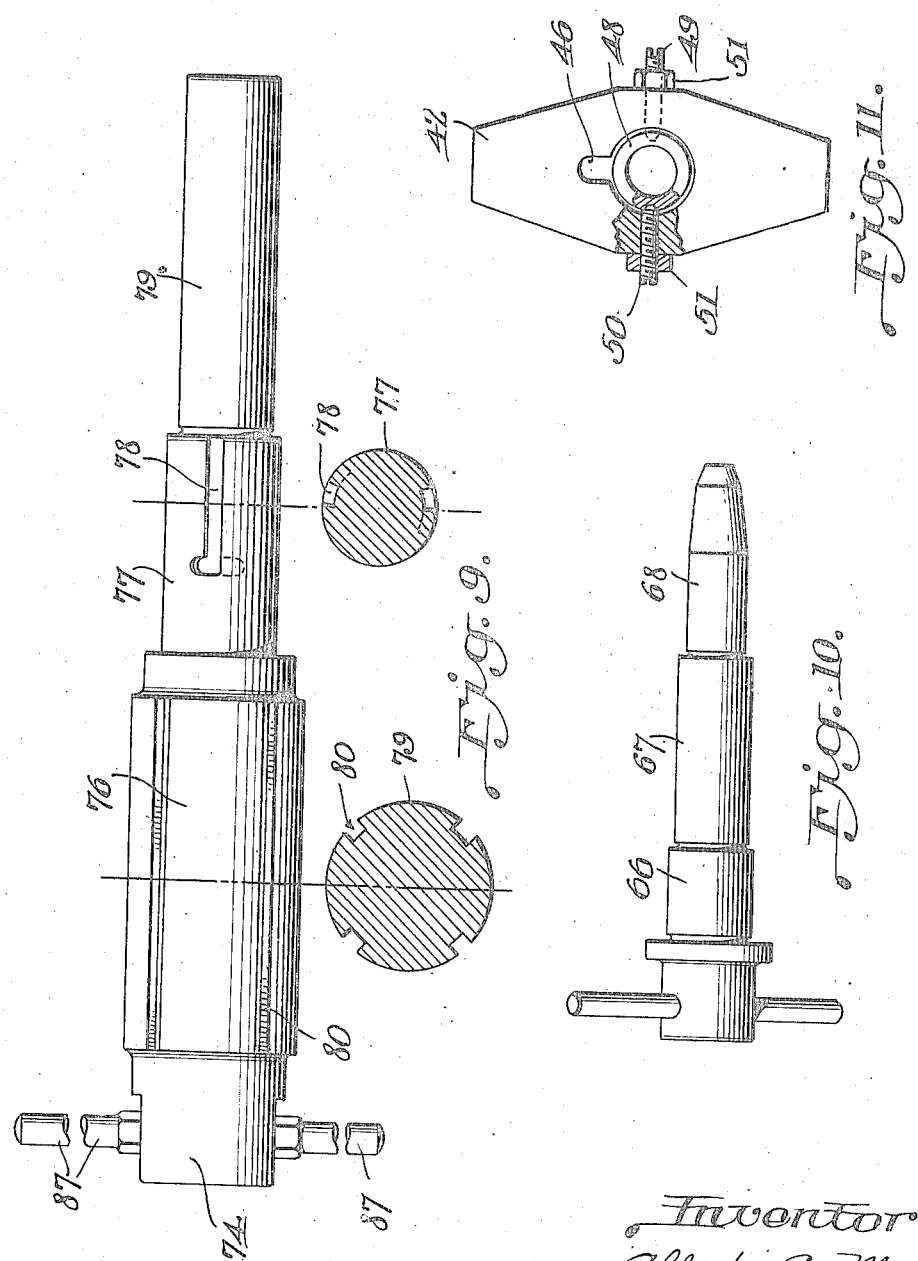

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

CONNECTING-ROD REAMER AND THE LIKE.

1,269,833.  Specification of Letters Patent.  Patented June 18, 1918.

Application filed October 5, 1917. Serial No. 194,853.

*To all whom it may concern:*

Be it known that I, ALBERT A. MARTELL, a citizen of the United States, and a resident of the city of Woonsocket, in the county of Providence, State of Rhode Island, have invented certain new and useful Improvements in Connecting-Rod Reamers and the like, of which the following is a specification.

This invention relates broadly to a method and apparatus for alining bearings, and more particularly to a method and apparatus for alining connecting rod bearings and the like.

The principal object of this invention is that of a method, and also an apparatus by which the method may be carried out, for alining bearings in the ends of connecting rods and the like, with the connecting rod under pressure in the direction of its length.

A further and equally important object of the present invention is the method and apparatus for maintaining a connecting rod in such position that the axis of the bearing in one end will be exactly parallel to the axis to which the bearing at the other end is being reamed whereby when the connecting rod is finished the bearings will be exactly parallel.

Another object of the present invention is an apparatus of the character specified wherein the connecting rod is maintained under distributed forces analogous to the normal working forces effecting the connecting rod while in normal use, whereby all tendency of distortion is automatically reduced to a minimum.

Another and further object of the present invention is the provision of a fixture wherein the foregoing method may be carried out with accuracy and rapidity; and also the compensating forces are automatically equalized on each side of the longitudinal axis of the connecting rod.

Other and further objects of the present invention will in part be obvious and will in part be pointed out in the specification hereinafter following by reference to the accompanying drawings wherein like parts are represented by like characters throughout the several figures thereof.

Figure 1 is a perspective view illustrating the device with the line reamer removed.

Fig. 2 is a plan view showing the line reamer in position.

Fig. 3 is a side elevational view of the device as shown in Fig. 2.

Fig. 4 is a detail view of the reamer shaft holder to facilitate adjusting the reamer head.

Fig. 5 is a detail view of the connecting rod head support and adjustment member.

Fig. 6 is a back view showing the device illustrated in Fig. 5.

Fig. 7 is a view showing a front elevation of the device shown in Figs. 5 and 6.

Fig. 8 is a plan view of the device shown in Figs. 5, 6 and 7.

Fig. 9 is a view of the reamer shaft with the reamer removed.

Fig. 10 is a view of the holding pin for the small end of the connecting rod.

Fig. 11 is a detail view of the mounting for the compensating pressure yoke or bar.

Heretofore in the art it has been the custom to drill or ream connecting rod bearings without use of special fixtures for positioning such bearings and where particularly close fitting parts for fine work were desired the bearings were scraped by hand. With these methods it is obvious that accurate dimensions could not be maintained and the axis of the bearings was not always absolutely perpendicular to the longitudinal axis of the connecting rod. Where such inaccuracies occur there is a tendency to cause the connecting rod to slightly bend or "whip" thereby causing side shocks to the piston and to the crank shaft bearings and generally introducing undesirable vibrations in the operation of the engine or like machine.

The present invention entirely overcomes the foregoing difficulties by providing a support which stresses the connecting rod to produce results similar to the actual working forces on the connecting rod and at the same time accurately alining the connecting rod relative to the axis of the finished bearing so that the axes of both bearings in the connecting rod are substantially parallel. The apparatus for carrying out the foregoing method includes adjustable supporting devices adapted to sustain the end of the connecting rod being reamed whereby the connecting rod may be raised or lowered to properly position the axis of the bearing; and also includes adjustable pressure plugs whereby predetermined compression forces are brought to bear against the end of the connecting rod. After the connecting rod is positioned it is adapted to be reamed by the suitable reaming device as will be hereinafter described.

One form of apparatus for carrying out the foregoing method comprises a hollow base 1 which preferably is provided with three feet 2 that are arranged in triangular relationship to form a three-point support. The upper portion of the base is surfaced as at 4 to comprise a bed on which is seated a bracket 5 which will hereinafter be more fully described. At the other end of the base and beyond the surfaced bed 4 is provided a pair of upstanding arms 6 and 7; the arm 6 is fitted with a large bearing sleeve 8 and the arm 7 is likewise fitted with a smaller bearing sleeve 9. These bearing sleeves are accurately ground on their interior surfaces to closely fit a reamer carrying shaft, as will be explained later. The arms 6 and 7 are provided with offset portions 10 and are drilled adjacent these offset portions to carry a stub shaft 11 that is clamped in position by stub screws 12. This shaft 11 carries a clamp arm 14 which is provided on one side with a surfaced button 15 adapted to abut against the side of the connecting rod to be reamed and to constitute a side thrust abutment. The clamp arm 14 is split and is provided with a clamp bolt 16 whereby the arm may be positioned at suitable intervals upon the shaft 11. The bracket 5 comprises a bed 17 which is slotted at 18 and 19 to permit longitudinal adjustment movements of the base on the surfaced bed 4 and enables the stub bolts 20 and 21 to be operated to clamp the bracket 5 very tightly to the bed 4. The bed 4 is provided with a longitudinal keyway 22 and the bracket 5 carries on its underneath portion a key 24 that fits the keyway 22 whereby the bracket 5 is accurately positioned at all times relatively to the surfaced bed 4. Side arms 25 and 26 are integral with the bracket base 17 and are joined by an integral strengthening rib 27 to constitute a rigid construction adapted to withstand tension and compression forces. The side arms 25 and 26 are also provided with bearing sleeves 28 and 29 which are accurately ground on their interior surfaces to fit the supporting pin 30.

Referring more particularly to Figs. 2 and 3 for general construction and Figs. 5 to 8 for detailed construction, the pressure head will now be described. This pressure head is mounted very rigidly upon the base 1 by means of suitable stub bolts 36 and comprises a heavy frame provided with a triangular shaped vertical web 37 integral with and at right angles to a vertical bar 38. The vertical bar 38 is provided with accurately formed openings in which are slidable the pressure plugs 39 and 40. A heavy hand operated screw 41 carries a pressure yoke 42 that bears upon the rounded heads 44 and 45 of the pressure plugs 39 and 40. The yoke 42 is provided with an opening 46 which coöperates with the guide screw 47 to maintain the yoke in proper position over the rounded heads 44 and 45 of the pressure plugs. This opening 46 is relatively large to permit considerable freedom of movement of the yoke, particularly movement in a vertical plane. The hand pressure screw 41 carries a trunnion collar 48 which is provided with diametrically opposed sockets into which the conical ends of the trunnion screws 49 and 50 are adapted to fit whereby the yoke 42 is permitted a slight swinging movement in a vertical plane relatively to the pressure screw 41. The trunnion screws are provided with suitable lock nuts 51. The hand operated screw 41 projects outwardly some distance from the yoke 42 and is provided with a head 52 that carries the cross-bar 54. Slight bosses 55 are provided on the sides of the vertical bar 38 and are accurately machined to form seats for the ends of the arms of the yoke 56 which are pivotally mounted on the screw bolts 57. The yoke 56 carries at its lower middle portion a supporting cradle that is mounted upon the screw bolt 59 to oscillate about a substantially horizontal axis. This cradle carries a pair of oppositely disposed accurately formed supporting blades 60 that are adapted to sustain the weight of the head of the connecting rod and will be later explained. A button 61 constitutes a locknut for the screw bolt 59 and at the same time comprises a work face against which the adjustment screw 62 bears whereby the yoke 56 may be swung on the pivot bolts to vertically adjust the ends of the supporting blades 60.

In operating this device to carry out the method the connecting rod 64, after having the bearing 65 in the small end carefully formed, is positioned between the side arms 25 and 26 of the bracket 5 and the supporting pin 30 is positioned through the bearing sleeves 28 and 29 and through the bearing 65 of the small end of the connecting rod 64. The portion 66 of the supporting pin 30 accurately fits the bearing 28, the middle portion 67 accurately fits the bearing 65 and the portion 68 accurately fits the bearing 29 so that the small end of the crank shaft is now accurately supported by the supporting bracket 5. The larger end of the crank shaft carrying the split bearing 69 rests with the turned portion or ring 70 of the bearing in position on the supporting blades 60. The adjustment screw 62 is operated to raise or lower the supporting cradle 58 to bring the split bearing 69 into proper vertical position relatively to the axis of the bearing sleeves 8 and 9 on the device. The clamp arm 14 is also positioned with the face of the button 15 against the side of the connecting rod 64. Where the device is adjusted to operate upon standardized parts the adjustments just referred to need not be made but once and are thereafter maintained as standard.

After the connecting rod has been positioned as specified the hand operated screw 41 is turned to cause pressure to be applied through the yoke 42, the pressure plugs 39 and 40 to the ends of the bearing bolts 71 and 72. This pressure is increased gradually until the connecting rod 64 is under a longitudinal compression force which is substantially equal to the force to which the rod will be subjected when in actual operation in the engine. These compression forces it will be noted are applied through relatively freely movable and equalized parts so that any distortion of the connecting rod is automatically compensated for and the forces are applied equally on opposite sides of the neutral axis of the connecting rod.

After the connecting rod is positioned as specified the reamer 74 is positioned through the bearing sleeve 8 to bring the blades of the reamer 75 into engagement with the end of the split bearing 69. The reamer shaft carries a reamer of the character described in my pending application Serial No. 179,191, filed July 7, 1917, and is provided with a portion 76 which accurately fits the large bearing sleeve 8; a middle portion 77 provided with slots 78 to receive the locking screws carried by the reamer 75; and a smaller portion 79 which accurately fits the smaller bearing sleeve 9. The smaller portion 79 is of such length relative to the other parts as to permit a good bearing to be established between this portion and the bearing sleeve 9 before the cutter blades of the reamer 75 enter the split bearing 69. As explained in my pending application referred to on the reamer, it is sometimes desirable to adjust the blades diametrically inwardly or outwardly whereby the opening may be reamed to required dimensions, such as the accurate dimension of the crank shaft upon which the particular split bearing is to operate. The adjustment of the reamer as explained in the reamer application is accomplished by rotating the reamer ring. In order to facilitate this operation the portion 76 of the reamer stub shaft is provided with grooves 80 and the arm 6 is provided with a rotatable head 81 that carries a key 82 adapted to fit the grooves 80 when the head is lifted against the pressure of the spring 84 and the cross-bar 85 permitted to drop into slots 86. This rigidly locks the reamer shaft 74 against rotative movement and thereby facilitates the adjustment of the reamer as specified.

The reamer head is provided with handles 87 which enable the operator to rotate the reamer and thereby accurately ream the split bearing.

The actual use of the foregoing specified method and apparatus demonstrates that crank shaft bearings formed in accordance with this method are so related that the axes thereof are substantially parallel and that such bearings wear longer and with less friction than bearings formed by any other known method.

Realizing that the foregoing specified method may be carried out by constructions differing in detail from the apparatus herein specifically disclosed, I desire that the disclosure herewith be understood as illustrative and not in the limiting sense.

Having thus described my invention what I claim is:

1. The method of reaming connecting rod bearings and the like, comprising supporting the connecting rod by one bearing; compressing the connecting rod in the direction of its length; and then reaming the other bearing while the connecting rod is under compression.

2. The method of reaming connecting rod bearings and the like, comprising supporting one end of the connecting rod by the bearing therein; compressing the connecting rod by applying forces at the other end and on opposite sides of the neutral axis of the rod; and then reaming the other bearing while the connecting rod is under stress.

3. The method of finishing crank shaft bearings for connecting rods and the like, which consists in supporting the connecting rod; stressing the connecting rod on each side of the neutral axis thereof; and then reaming the crank shaft bearing while the connecting rod is under stress.

4. The method of finishing connecting rod bearings and the like, which comprises supporting the connecting rod on one end by a member substantially fitting the bearing in the said end; then applying compression forces at the other end of the connecting rod and upon opposite sides of the neutral axis thereof; then reaming the crank shaft bearing while the connecting rod is under compression forces.

5. The method of reaming connecting rod bearings and the like, comprising finishing the bearing on one end of the crank shaft; supporting the end of the crank shaft by a member fitting the finished bearing; then applying balanced forces against the other end of the connecting rod whereby said connecting rod is compressed under equal forces on opposite sides of the neutral axis; then reaming the other bearing while the connecting rod is under compression forces.

6. The method of finishing connecting rod bearings and the like, which comprises supporting the connecting rod and loading the same with an artificial load applied in the same direction as the working load when the connecting rod is assembled in at working machine; and then reaming a bearing while the connecting rod is under the artificial load.

7. The method of reaming connecting rod bearings and the like, comprising the supporting of the connecting rod by a member fitting one bearing; and then compressing the connecting rod by forces applied to each side of the crank shaft bearing; then reaming the crank shaft bearing while the connecting rod is under compression forces.

8. The method of reaming connecting rod bearings and the like, comprising supporting the connecting rod by one bearing; resting the other end on a compensating cradle; compressing the connecting rod in the direction of its length; and then reaming the other bearing while the connecting rod is under compression.

9. The method of reaming connecting rod bearings and the like, comprising supporting one end of the connecting rod by the bearing therein; resting the other end of the connecting rod on a compensating support; compressing the connecting rod by applying forces at the other end and on opposite sides of the neutral axis of the rod; and then reaming the other bearing while the connecting rod is under stress.

10. The method of finishing connecting rod bearings and the like, which consists in supporting one end of the connecting rod; resting the other end of the connecting rod upon a compensating support; stressing the connecting rod on each side of the neutral axis thereof; and then reaming the crank shaft bearing of the connecting rod while the connecting rod is under stress.

11. The method of finishing connecting rod bearings and the like, which comprises supporting the connecting rod on one end by a member substantially fitting the bearing in the said end; resting the other end upon a compensating support; then applying compression forces at the other end of the connecting rod and upon opposite sides of the neutral axis thereof; then reaming the crank shaft bearing while the connecting rod is under compression forces.

12. The method of reaming connecting rod bearings and the like, comprising finishing the bearings on one end of the crank shaft; supporting the end of the crank shaft by a member fitting the finished bearings; supporting the other end of the connecting rod upon a compensating cradle; then applying balanced forces against the other end of the connecting rod whereby said connecting rod is compressed under equal forces on opposite sides of the neutral axis; then reaming the other bearing while the connecting rod is under compression forces.

13. The method of finishing connecting rod bearings and the like, which comprises supporting one end of the connecting rod by a member substantially fitting one bearing of said connecting rod; supporting the other end of said connecting rod upon a compensating support adapted to oscillate about an axis at substantially right angles to the axis of said bearing; then compressing said connecting rod in the direction of its length; then reaming the crank shaft bearing while said connecting rod is under compression.

14. The method of reaming crank shaft bearings for connecting rods and the like, which comprises supporting the connecting rod upon a member substantially fitting the end bearing of the connecting rod; supporting the crank shaft bearing end of the connecting rod upon a compensating member adapted to oscillate about an axis at substantially right angles to the axis of the first mentioned bearing; then adjusting said crank shaft bearing end in such manner that a predetermined axis passes through said crank shaft bearing; then compressing said connecting rod in the direction of its length; and then reaming said crank shaft bearing concentric with the said predetermined axis.

15. A device for accurately reaming connecting rod bearings and the like, comprising in combination, a base frame, means to support one end of the connecting rod to be reamed, means to support the other end of said connecting rod, devices to artificially load said connecting rod with compression forces in the direction of its length, and means to ream the crank shaft bearing of said connecting rod to a predetermined axis while under said compression forces.

16. A device for accurately reaming connecting rod bearings and the like, comprising in combination, a base frame, a bracket for supporting one end of a connecting rod, means to support the other end of said connecting rod, means to artificially load said connecting rod by compression forces in the direction of its length, and devices to ream the crank shaft bearing of said connecting rod while said connecting rod is under said compression forces.

17. A device for accurately reaming connecting rod bearings and the like, comprising in combination, a base frame, a bracket adjustably mounted on said base frame, a pin supported by said bracket and adapted to accurately fit an end bearing in said connecting rod, means to support the other end of said connecting rod whereby the crank shaft bearing therein is definitely positioned relatively to a predetermined axis, means to artificially load said connecting rod by compression forces acting longitudinally of said connecting rod, and means to ream said crank shaft bearing concentric with said predetermined axis.

18. A device for accurately reaming connecting rod bearings and the like, comprising in combination, a base frame, a bracket longitudinally adjustable on said base frame, means for guiding said bracket during adjustments, devices for locking said bracket in adjusted positions, a supporting pin carried by said bracket and adapted to accurately fit the bearing in the end of the connecting rod to be reamed, means to support the other end of said connecting rod, devices to compress said connecting rod longitudinally and on opposite sides of the neutral axis thereof, means for reaming said connecting rod while under compression forces.

19. In a device for accurately reaming connecting rod bearings and the like, the combination of a base frame, a bracket mounted upon said base frame, accurately formed bearing sleeves carried by said bracket, a supporting pin adapted to fit within said bearing sleeves and having a portion adapted to accurately fit the bearing in the end of said connecting rod to be reamed, means to support the other end of said connecting rod to be reamed whereby the crank shaft bearing therein is positioned relatively to a predetermined axis, means to compress said connecting rod longitudinally, and devices to ream said connecting rod concentric with said predetermined axis while said connecting rod is under compression forces.

20. A device of the character specified, comprising in combination, a base frame, means to support one end of a connecting rod to be reamed, compensating means for supporting the other end of said connecting rod, means to artificially load said connecting rod with compression forces acting in the direction of its length, means to contact with the side of the connecting rod at the end supported upon the compensating means to take up side thrusts during the reaming operation, and means to ream the crank shaft bearing while said connecting rod is under said compression forces.

21. A device for accurately reaming connecting rod bearings and the like, comprising in combination, a base frame, a pin adapted to accurately fit a bearing in the end of said connecting rod whereby said connecting rod is supported against endwise thrusts, a compensating cradle adapted to support the other end of said connecting rod, the axis of said compensating cradle being at substantially right angles to the axis of said pin, means to compress said connecting rod in the direction of its length, and means to ream said connecting rod while under compression forces.

22. A device for accurately reaming connecting rod bearings and the like, comprising in combination, a base frame, a supporting pin adapted to accurately fit the bearing in one end of the connecting rod to be reamed and constituting the sole support for one end of the said connecting rod, means to support the other end of said connecting rod, said means comprising a yoke pivoted on the axis substantially parallel to the axis of said pin, adjustable means for raising or lowering said yoke, devices for compressing said connecting rod in the direction of its length, and means to ream said connecting rod while under compression forces.

23. A device for accurately reaming connecting rod bearings and the like, said device comprising in combination, means to support one end of the connecting rod to be reamed, means to support the other end of said connecting rod whereby the bearing to be reamed is accurately positioned relatively to a predetermined axis, devices for compressing said connecting rod in the direction of its length, and means for reaming said bearing concentric with said predetermined axis while said connecting rod is under said compression forces.

24. A device for reaming connecting rod bearings and the like, comprising in combination, means to support one end of said connecting rod, a yoke pivotally mounted upon an axis at substantially right angles to the longitudinal axis of the connecting rod to be reamed, a cradle carried by said yoke, supporting members on said cradle and adapted to engage and support one end of said connecting rod, means to secure said connecting rod in position on said cradle, and devices to ream a bearing in said connecting rod while so positioned.

25. A device for accurately reaming connecting rod bearings and the like, comprising in combination, means to support said connecting rod with the axis of the bearing positioned relatively to a predetermined axis, means for stressing said connecting rod longitudinally, and devices for reaming a bearing of said connecting rod while in a stressed condition.

26. A device for accurately reaming connecting rod bearings and the like, comprising in combination, means to support a connecting rod, a pair of pressure plugs, compensating devices adapted to distribute pressure equally between said plugs, whereby the connecting rod is stressed on each side of the neutral axis thereof, and means for reaming said connecting rod while under stress.

27. A device for accurately reaming connecting rod bearings and the like and comprising means to support the connecting rod to be reamed, pressure devices comprising pressure plugs having rounded heads, a compensating bar resting on said rounded heads, means for loading said compensating bar whereby the load is distributed to said pressure plugs to compress the connecting rod on each side of the neutral axis thereof, and means to ream the connecting rod while under compression forces.

28. A device for reaming connecting rod bearings and the like, comprising means to support a connecting rod, pressure plugs adapted to bear against the end of said connecting rod, a compensating bar bearing on said pressure plugs, a pressure screw, pivotal means connecting said pressure screw with said compensating bar whereby the forces developed through the action of said screw are distributed to said pressure plugs whereby the connecting rod is stressed, and means for reaming a bearing in the connecting rod while under stress.

29. A device for reaming connecting rod bearings and the like, comprising in combination, means to support a connecting rod, devices for positioning the bearing to be reamed relatively to a predetermined axis, means for stressing said connecting rod, a pair of guide members, and a reamer shaft coöperative with said guide members in such manner that the axis of said reamer shaft exactly coincides with the predetermined axis whereby the operation of said reamer shaft reams the said bearing concentric with the said predetermined axis.

30. A device for reaming connecting rod bearings and the like, comprising in combination, means to support the connecting rod, side thrust means comprising an adjustable abutment adapted to contact with the side of the connecting rod adjacent the bearing to be reamed, devices for compressing said connecting rod in the direction of its length, reamer guides on opposite sides of said connecting rod, and a reamer shaft coöperative with said reamer guides whereby a crank shaft bearing may be reamed while said connecting rod is under compression stresses.

31. In a device of the character described, the combination of means to support a member to be reamed, devices for stressing said member in the direction of its length, means for positioning the bearing to be reamed relatively to a predetermined axis, reamer guides positioned to guide a reamer shaft in such manner that the axis of said shaft coincides with said predetermined axis, and a reamer shaft coöperative with said reamer guides to ream said bearing concentric with said axis.

32. A device of the character described, comprising a supporting pin adapted to fit the bearing in one end of a connecting rod and the like, reamer guides having an axis parallel with the axis of said pin, means to position a connecting rod in such manner that the crank shaft bearing is definitely positioned relatively to said predetermined axis, means to stress said connecting rod, and a reamer shaft coöperative with said reamer guides whereby the operation of said reamer shaft finishes the crank shaft bearing concentric with said predetermined axis.

33. A device for accurately reaming connecting rod bearings and the like, comprising in combination, means to support a connecting rod with the crank shaft bearing accurately positioned relatively to a predetermined axis, means to guide a reamer shaft with the axis thereof coincident with the said predetermined axis, and holding devices to prevent the rotation of said reamer shaft whereby the reamer head may be operated to adjust the blades thereof.

34. A device of the character described, comprising in combination, a pair of upstanding arms, a supporting pin mounted in said upstanding arms and having a portion to exactly fit a bearing in a suitable connecting rod or the like, a second pair of upstanding arms, reamer shaft guide bearings mounted in said second pair of upstanding arms whereby a reamer shaft will be accurately guided on a predetermined axis, means to position a connecting rod with a bearing thereof adjacent said predetermined axis, and devices for applying pressure longitudinally of said connecting rod and on each side of said crank shaft bearing.

35. In a device for reaming connecting rod bearings and the like, means at the end of the connecting rod to support and clamp said connecting rod in the direction of its length whereby said connecting rod is free to bend in a manner analogous to actual working conditions of the connecting rod, and devices to ream certain of said connecting rod bearings while said connecting rod is clamped as specified.

ALBERT A. MARTELL.